(12) United States Patent
Hwang

(10) Patent No.: US 6,880,517 B1
(45) Date of Patent: Apr. 19, 2005

(54) TWO-STEP COMBUSTION SYSTEM

(75) Inventor: In-Ki Hwang, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/750,668

(22) Filed: Dec. 31, 2003

(30) Foreign Application Priority Data

Oct. 23, 2003 (KR) .................................. 10-2003-0074213

(51) Int. Cl.$^7$ .................................................. F02F 1/00
(52) U.S. Cl. ...................... 123/254; 123/90.16; 123/292
(58) Field of Search ................................. 123/254, 255, 123/292, 90.16, 90.17, 90.27

(56) References Cited

U.S. PATENT DOCUMENTS

| | | | | |
|---|---|---|---|---|
| 3,765,381 A | * | 10/1973 | Nilsson | 123/255 |
| 3,924,590 A | * | 12/1975 | Miyaki et al. | 123/274 |
| 4,401,072 A | * | 8/1983 | Ito et al. | 123/292 |
| 4,726,336 A | * | 2/1988 | Hoppie et al. | 123/292 |
| 5,067,458 A | * | 11/1991 | Bailey | 123/292 |
| 5,156,123 A | * | 10/1992 | Kawamura | 123/256 |

FOREIGN PATENT DOCUMENTS

JP 11-193730 7/1999

* cited by examiner

Primary Examiner—John T. Kwon
(74) Attorney, Agent, or Firm—Morgan Lewis & Bockius LLP

(57) ABSTRACT

A two-step combustion system configured to install an auxiliary combustion chamber at the upper lateral surface of the combustion chamber and to store some of the compressed fuel-air mixture in the auxiliary combustion chamber to allow the fuel-air mixture to be burnt again after the middle of an explosion stroke, thereby reducing the fluctuation range of the rotational force of a crankshaft.

9 Claims, 2 Drawing Sheets

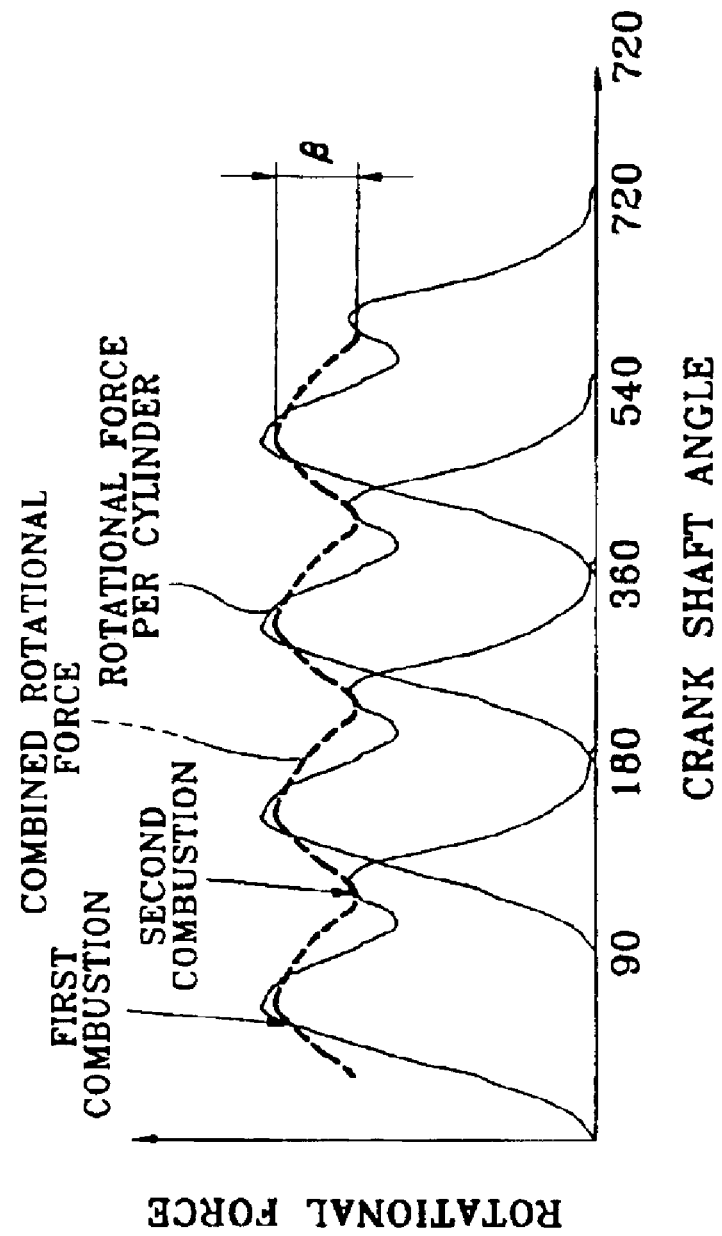

TWO-STEP COMBUSTION SYSTEM

CROSS-REFERENCE TO RELATED APPLICATIONS

This application claims priority of Korean Patent Application No. 10-2003-0074213, filed on Oct. 23, 2003, the disclosure of which is incorporated fully herein by reference.

FIELD OF THE INVENTION

The present invention relates to a two-step combustion system and, more particularly, to a two-step combustion system with an auxiliary combustion chamber located at the upper side of the combustion chamber to partially store fuel-air mixture compressed in the auxiliary combustion chamber and to burn the fuel-air mixture again in the middle of an explosion stroke, thereby reducing the fluctuation range of the rotational force of a crank shaft.

BACKGROUND OF THE INVENTION

In general, an engine is the power generating mechanism that provides energy for a vehicle and principally includes a lubricating device, a fuel device, a cooling device, a suction/exhaust device, an ignition device, and the like.

An engine is a heat engine, which uses fuel as a heat source and supplies heat energy generated by the fuel to an operating fluid to burn and explode the fuel. The engine transforms the force generated by the combustion of the operating fluid to a rotational force on a shaft, thereby creating mechanical energy for obtaining power.

In other words, heat energy is transformed to the reciprocating movement of a piston, and the reciprocating movement is again transformed to a rotational power.

Conventionally, in order for a gas engine to continue the periodic movement of a piston via a burning process, burnt gas should be discharged and a new fuel-air mixture should be supplemented. As a result, suction/exhaust valves should be opened and closed in an accurate manner in coordination with the rotation of a crankshaft.

The periodic change of a piston in a cylinder is called an engine cycle, where mixed gas is sucked into a cylinder to be burnt and an exhaust gas generated therefrom is discharged outside. A gasoline engine typically has two types of cycles, one being a 4-cycle engine and the other being a 2-cycle engine. But a 4-cycle engine is mainly used for wide ranges of speed change and good fuel consumption.

In particular, a 4-cycle engine is an engine that completes a fuel-burning process in four strokes, where one stroke means a movement or a distance from an upper dead center to a bottom dead center of a piston.

During an intake stroke, the piston descends from the upper dead center to the bottom dead center sucking the fuel-air mixture, during which the suction valve is opened while the exhaust valve is closed.

A compression stroke is a stroke in which the piston ascends from the bottom dead center to the upper dead center to compress the sucked fuel-air mixture and during which the suction valve and the exhaust valve are closed such that the pressure and temperature of the fuel-air mixture increase. Accordingly, a piston carries out two strokes to rotate a crankshaft one time.

An expansion stroke is a stroke in which the compressed fuel-air mixture is ignited so that the mixture expands, and pressure generated therefrom presses down on the piston to generate actual power during which the suction valve is closed. Gas expands in response to the descent of the piston, while the pressure and temperature decrease.

An exhaust stroke is a stroke in which a piston at the bottom dead center is again moved to the upper dead center to discharge the expanded gas outside of the piston during which only the exhaust valve is opened.

When a piston completes the 4-stroke cycle that includes the suction, compression, expansion and exhaust strokes, the crankshaft is rotated twice to finish one operation of a power generating movement.

However, the size of rotational force, in relation to changes in the inertia force of the moving parts and combustion pressure inside a piston, is increased and decreased repeatedly in response to the rotational angle of a crankshaft. In other words, the rotational force of the crankshaft reaches its highest point during the expansion stroke of the first cylinder and is gradually decreased and again reaches the highest point during the expansion strokes of a third cylinder, a fourth cylinder, and a second cylinder. These movements are repeated to resemble a sine curve. The big fluctuation in rotational force as the crankshaft periodically changes its rotation speed such that a flywheel is typically mounted at a rear end part of the crankshaft in order to obtain a predetermined size of rotational force.

SUMMARY OF THE INVENTION

There is a drawback in the conventional combustion system of an engine in that vibration and noise from the engine are significant due to large fluctuation ranges of rotational force at the crankshaft, thus causing damage to the engine.

There is another drawback in that the flywheel mounted at the rear end part of the crankshaft, for a speed change reduction in the crankshaft, causes damage to the crankshaft due to an increased torsion of the crankshaft and results in a decrease in the acceleration capability during the start of the vehicle.

The present invention provides a two-step combustion system configured to carry out the combustion of the fuel-air mixture in two-steps in order to reduce the difference between a maximum rotational force and the minimum rotational force at the crankshaft.

In accordance with a preferred embodiment of the present invention, the two-step combustion system of an engine, wherein a fuel-air mixture is sucked into a combustion chamber by an operation of a suction valve driven by a cam for a suction valve mounted at an upper side of a cylinder head, and ignited by an ignition plug and burnt, comprises an auxiliary combustion chamber, a cam for an auxiliary combustion chamber, a rocker arm and an auxiliary combustion chamber valve. The auxiliary combustion chamber is formed at an upper lateral surface of a main combustion chamber to be recessed toward a cylinder head. The cam for the auxiliary combustion chamber valve is formed at a cam shaft mounted at an upper side of the cylinder head and connected to a crankshaft of an engine via a belt to receive power for rotation. The rocker arm is contacted at a first bottom distal surface of the rocker arm with a surface of the cam for an auxiliary combustion chamber valve and swung about a fixed axle to thereby transfer power by way of leverage operation. The auxiliary combustion chamber valve is contacted at a second bottom distal surface of the rocker arm to vertically move and to open and close an inlet of the auxiliary combustion chamber.

BRIEF DESCRIPTION OF THE DRAWINGS

For a better understanding of the nature and objects of the present invention, reference should be made to the following detailed description with the accompanying drawings, in which:

FIG. 2 is a graph for illustrating an experimental result where changes of rotational force are shown in response to a rotational angle of a crankshaft at a two-step combustion system according to an embodiment of the present invention.

DETAILED DESCRIPTION OF THE PREFERRED EMBODIMENT

Figure 1:
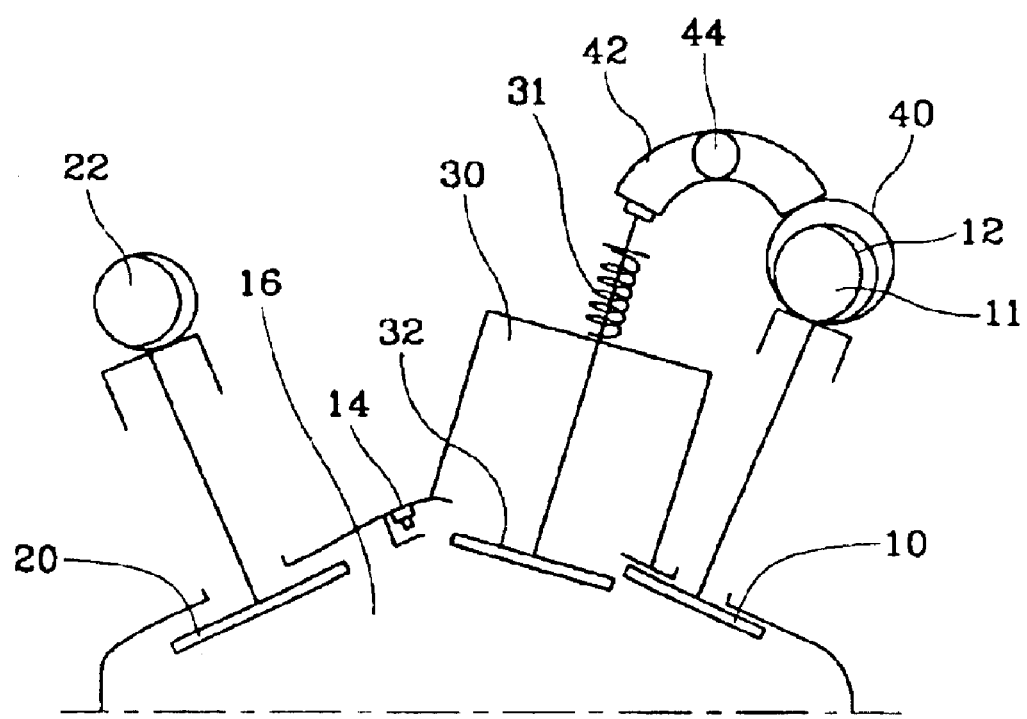
FIG. 1 is a schematic constitutional drawing for illustrating a construction of a two-step combustion system according to an embodiment of the present invention.

The preferred embodiment of the present invention will now be described in detail with reference to the annexed drawings, where the present embodiment is not limiting the scope of the present invention but is given only as an illustrative purpose.

Referring to FIGS. 1, 2, a two-step combustion system comprises: an auxiliary combustion chamber 30 formed at an upper lateral surface of a main combustion chamber 16; a cam 40 for an auxiliary combustion chamber valve mounted at a cam shaft 11 of a suction valve; a rocker arm 42 activated by the cam 40 for an auxiliary combustion chamber; and an auxiliary combustion chamber valve 32 for opening and closing an inlet of the auxiliary combustion chamber 30 in response to the movement of the rocker arm 42.

In particular, the main combustion chamber 16 is a combustion space encircled by a bottom surface of a cylinder head and an upper lateral surface of a piston, and the auxiliary combustion chamber 30 is a space formed at an upper lateral surface of the main combustion chamber 16 to be recessed toward a body of the cylinder head side.

The auxiliary combustion chamber 30 stores part of the fuel-air mixture compressed before ignition of the main combustion chamber 16 and discharges the stored compressed fuel-air mixture in the middle of an expansion stroke to the main combustion chamber 16 to cause a secondary explosion.

The cam 40 for an auxiliary combustion chamber valve is formed on the same shaft as that of the cam shaft 11 where a suction valve cam 12 is formed, and is shaped like an eccentric circle to conform to the timing of when the auxiliary combustion chamber valve 32 opens, which is unlike the conventional suction/exhaust valves 10 and 20. The cam 40 for an auxiliary combustion chamber valve has a minimum radius at the time when the auxiliary combustion chamber valve 32 is closed, which is just before the ignition of the main combustion chamber 16.

The cam shaft 11 where the cam 40 for the auxiliary combustion chamber valve is mounted is connected to a crankshaft (not shown) of an engine via a belt to receive power for rotation.

The opening and closing of the auxiliary combustion chamber valve 32 should be realized in an exact proportion to an operation time of the suction valve 10 such that preferably the cam 40 for the auxiliary combustion chamber valve is formed on the same cam shaft 11 as that of the suction valve cam 12.

The rocker arm 42 is connected at one bottom distal end surface of the rocker arm to a surface of the cam 40 for the auxiliary combustion chamber valve, and the other bottom distal end surface of the rocker arm contacts a stem end of the auxiliary combustion chamber valve 32 that is secured to a cylinder head as a center thereof to be swung about a fixed axle 44.

As a result, the rocker arm 42 is rotated about the fixed axle 44 in response to the rotation of the cam shaft 11, to transfer power to the auxiliary combustion chamber valve 32 by way of leverage operation.

The auxiliary combustion chamber valve 32 is mounted at an inlet of the auxiliary combustion chamber 30 and receives power from the rocker arm 42 to vertically move and to open and close the inlet of the auxiliary combustion chamber 30. The auxiliary combustion chamber valve 32 is equipped at an upper side thereof with a valve spring 31.

Next, the operation of the present invention as constructed above will be described.

The auxiliary combustion chamber valve 32 is opened up at the end of the compression of the main combustion chamber 16 and is closed just before ignition to store part of the compressed fuel-air mixture in the auxiliary combustion chamber 30.

When ignition is effected by an ignition plug 14 to burn fuel in the main combustion chamber 16 and the auxiliary combustion chamber valve 32 is opened after the middle of an explosion stroke, the fuel-air mixture stored in the auxiliary combustion chamber 30 is discharged to the main combustion chamber 16 to generate a secondary combustion at the main combustion chamber 16 and the auxiliary combustion chamber 30 at the same time.

At this time, because combustion is being effected at the main combustion chamber 16, a separate ignition by the ignition plug 14 is not needed to allow a natural firing to be realized.

Even during an exhaust stroke in the main combustion chamber 16, the auxiliary combustion chamber valve 32 is opened such that combustion gas in the auxiliary combustion chamber 30 is discharged out of the cylinder along with the combustion gas in the main combustion chamber 16.

As shown in FIG. 2, when power output is obtained by the two-step combustion system, the fluctuation range between the maximum rotational force and the minimum rotational force of the crankshaft has been greatly reduced.

In other words, the fluctuation range ($\beta$) between the maximum rotational force and the minimum rotational force of the crankshaft is greatly reduced when compared with that of a conventional engine.

The reason the fluctuation range is greatly decreased is that power output is again obtained by the secondary combustion at a time when the rotational force is gradually reduced after the first combustion in the main combustion chamber to thereby decrease a phase difference of the combined rotational force.

Furthermore, any mixed gas that is incompletely burnt and remaining in the first combustion process is given an opportunity of being burnt again in the secondary combustion process to thereby increase fuel consumption.

As apparent from the foregoing, there is an advantage in the two-step combustion system as described according to an embodiment of the present invention in that a decrease in the fluctuation range of the rotational force at a crankshaft serves to reduce vibration and noise of an engine, making it conducive for silent driving, to increase fuel efficiency by way of a secondary combustion and to enhance fuel consumption.

There is another advantage in that a flywheel mounted at the rear end of the crankshaft for an even rotational speed of the crankshaft can be reduced in weight thereof to enhance the reduction of the engine's weight and the vehicle's acceleration capability.

There is still another advantage in that the torsional vibration of the crankshaft is reduced during a high speed of rotation of the engine to thereby improve the durability of the crankshaft, dispensing with a damper pulley for the reduction of torsional vibration, and minimizing the engine's manufacturing cost.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto.

What is claimed is:

1. A two-step combustion system of an engine, wherein a fuel-air mixture is sucked into a combustion chamber by an operation of a suction valve driven by a cam for said suction valve mounted at an upper side of a cylinder head, and ignited by an ignition plug and burnt, the system comprising:
   an auxiliary combustion chamber formed at an upper lateral surface of a main combustion chamber to be recessed toward a cylinder head, wherein said fuel-air mixture of said combustion chamber is sucked into said auxiliary combustion chamber and only discharged from the auxiliary chamber into said main combustion chamber once combustion has commenced within said main chamber;
   a cam for an auxiliary combustion chamber valve formed on a suction valve cam shaft mounted at an upper side of said cylinder head and connected to a crankshaft of an engine via a belt to receive power for rotation;
   a rocker arm for being contacted at a first bottom distal end surface of said rocker arm with a surface of the cam for an auxiliary combustion chamber valve and swung about a fixed axle to thereby transfer power by way of leverage operation; and
   an auxiliary combustion chamber valve being contacted at a second bottom distal end surface of said rocker arm to vertically move and to open and close an inlet of said auxiliary combustion chamber.

2. The system as defined in claim 1, wherein said cam for said auxiliary combustion chamber is formed on the same cam shaft as that of said suction valve cam.

3. The system as defined in claim 1, wherein said cam for said auxiliary combustion chamber is shaped like an eccentric circle such that said auxiliary combustion chamber valve is opened prior to an end of compression, closed before ignition, and opened after the middle of an explosion stroke.

4. A two-step combustion system of an engine, said combustion system comprising:
   a main combustion chamber in which a primary combustion occurs during an explosion stroke;
   an auxiliary combustion chamber extending from said main combustion chamber;
   an auxiliary combustion chamber valve configured to discharge a fuel-air mixture into said main combustion chamber only once said primary combustion has commenced within said main chamber, thereby causing a secondary combustion within at least said main combustion chamber.

5. The two-step combustion system of claim 4, wherein said auxiliary combustion chamber valve is configured to discharge a fuel-air mixture into said main combustion chamber after a middle of an explosion stroke.

6. The two-step combustion system of claim 4, wherein said auxiliary combustion chamber valve is also configured to open prior to an end of compression and close prior to ignition.

7. The two-step combustion system of claim 4, further comprising:
   a cam for said auxiliary combustion chamber valve formed on a suction valve cam shaft mounted at an upper side of a cylinder head and connected to a crankshaft of an engine via a belt to receive power for rotation;
   a rocker arm for being contacted at a first bottom distal end surface of said rocker arm with a surface of the cam for an auxiliary combustion chamber valve and swung about a fixed axle to thereby transfer power by way of leverage operation, wherein said auxiliary combustion chamber valve is contacted at a second bottom distal end surface of said rocker arm to vertically move and to open and close an inlet of said auxiliary combustion chamber.

8. The system as defined in claim 7, wherein said cam for said auxiliary combustion chamber is formed on the same cam shaft as that of said suction valve cam.

9. The system as defined in claim 7, wherein said cam for said auxiliary combustion chamber is shaped like an eccentric circle such that said auxiliary combustion chamber valve is opened prior to an end of compression, closed before ignition, and opened after the middle of an explosion stroke.

* * * * *